April 21, 1953 W. J. CLARKE 2,636,073
HOUSING FOR ELECTRICAL CIRCUIT UNITS
Filed Dec. 19, 1950

INVENTOR
W. J. CLARKE
BY [signature]
ATTORNEY

Patented Apr. 21, 1953 2,636,073

UNITED STATES PATENT OFFICE 2,636,073

HOUSING FOR ELECTRICAL CIRCUIT UNITS

Walter J. Clarke, Chatham, N. J., assignor to Bell Telephone Laboratories, Incorporated, New York, N. Y., a corporation of New York Application December 19, 1950, Serial No. 201,649

5 Claims. (Cl. 174—52)

This invention relates to housings for electrical circuit units and more particularly to the arrangement and sealing of circuit components in their housings.

One object of this invention is to improve potting arrangements for electrical apparatus.

More specific objects include the reduction of the number of parts necessary for and the cost of potting apparatus, the avoidance of damaging pressures on potted apparatus particularly when subjected to high temperatures, and the maintenance of a tight seal over the potted apparatus.

One feature of this invention resides in providing a mechanical buffer intermediate the potting material on electrical apparatus and the outer seal of the assembly.

Another feature resides in forming the mechanical buffer of a mass of finely divided particles of dielectric so that the space between the particles forms a void into which expanded soft potting material can flow. The buffer is located over the soft potting compound and is maintained in that location by use of a potting material and a finely divided material which have the same order of specific gravity. Thus, when the potting material becomes hot enough to melt, the finely divided material maintains its position relative thereto.

Figure 1:
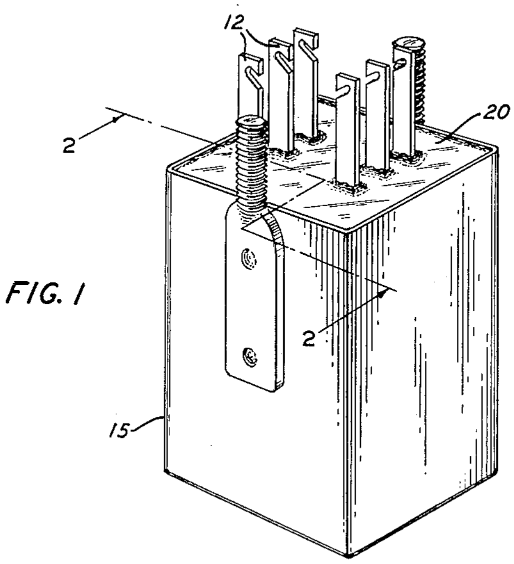
Figure 2:
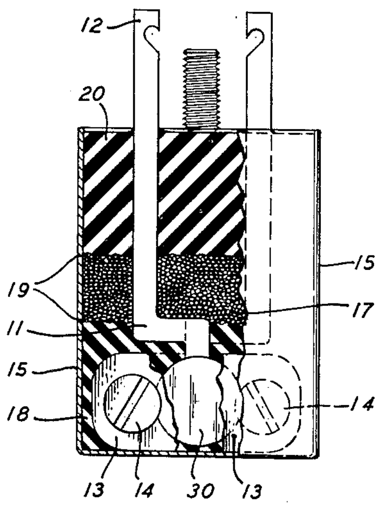

The above and other objects and features of this invention may be more fully understood from the following detailed description of a specific embodiment when read in conjunction with the accompanying drawing, in which:

Fig. 1 is a perspective view of an electrical unit constructed in accordance with this invention; and Fig. 2 is a partly sectioned elevation of the unit of Fig. 1.

In the drawing a copper oxide rectifier or varistor assembly is shown comprising a plurality of copper bodies, one of which is shown at 30 in Fig. 2, having copper oxide films on one face (not shown), flat electrodes having integral leads 11 and soldering terminals 12 on each face of the copper bodies and clamping plates 13 on both ends of the stack formed by the alternate electrodes and copper bodies. One of the clamping plates is provided with threaded apertures which receive the clamping screws 14 thereby providing means for adjusting the pressure on the stack. The clamping plates 13 are of an insulating material, such as phenol fiber, and are so proportioned that their edges extend beyond the edges of the elements in the varistor stack to insure the electrical isolation thereof from the casing 15. The varistor unit is positioned in a cup-shaped metallic container 15 which is preferably seamless so that when the open end is perfectly sealed there is no possibility of the entrance of moisture into the container or the exudation of potting material at seams.

It is often desirable to employ materials in potting electrical components or circuit units which have physical characteristics which make them difficult to control. For example, they may become fluid and expand a relatively large amount within the operating temperatures of the components they surround so that undue pressures are applied to the components and the material tends to break the casing seals and exude therefrom. One such material which it is advantageous from an electrical standpoint to employ with components such as copper oxide varistors in a mixture of low molecular weight grades of polyethylene and polyisobutylene, a soft sticky thermoplastic potting material which has a relatively high temperature coefficient of expansion. This material is disclosed and its characteristics discussed in the application Serial No. 134,784, filed December 23, 1949.

According to this invention, polyethylene-polyisobutylene and materials having similar physical characteristics can be enclosed in a sealed container without the disadvantages set forth above by providing a buffer in the form of a void or a gas pocket 17 within the container into which the expanding soft material can flow. The only pressure created by such an expansion is that of the compressed gas, a relatively low pressure which is insufficient to cause a rupture of the container wall or seal.

In the illustrative device the component is potted in its container by first mounting it in a housing or cam 15; in the case of the varistor shown this is done by resting its clamping plates on the bottom of the can. Melted potting material 18 is next poured over the component until its surface in the can is above the uppermost portions of the component. During this operation the atmosphere should be warm and dry to prevent the occurrence of any conductive surfaces on the component or can due to moisture. The potting material is poured at an elevated temperature to increase its fluidity. The polyethylene-polyisobutylene mixture can be poured conveniently at 120° C. to 150° C. The potting material is then cooled to cause it to thicken to a non-flowing consistency. The polyethylene-polyisobutylene compound becomes a soft gel below about 100° C. as the polyethylene component is cooled to its crystalline point.

A layer 19 of finely divided material is then poured over the solidified potting layer 18. This finely divided material is preferably in the form of small spheres or bodies having smoothly curving surfaces for ease of pouring and fluidity in attaining a uniform layer over the potting material, although irregular material can be distributed properly by vibrating the container. The voids 17 between the particles provide the buffer. It is therefore desirable that the space between the particles be a substantial portion of the volume of the layer and to this end it is also desirable that the particles be of relatively uniform size. Another characteristic which is advantageous in the material of this layer 19 is that it should not be adsorbent particularly of the fluid sealing material. A further quality which is important is that the materials of the potting and buffer layer should not be of such specific gravity that they intermingle freely, otherwise the particles might work their way into positions where they may damage the component. Thus, the specific gravity of the finely divided material should be of the order of or less than that of the potting material. One material that meets the above requirements successfully when combined with polyethylene-polyisobutylene, which has a specific gravity of about 0.93 and continues as a gel to high temperatures, is polystyrene in the form of beads having diameters ranging from 5 to 30 mils and averaging about 10 to 15 mils.

Polystyrene has a specific gravity of 1.05 and this is not so much greater than that of the jelly-like polyethylene-polyisobutylene potting material that the particles will tend to sink at ordinary service temperatures up to about 85° C. and it is not the practice to operate components at high temperatures where the potting compound is actually fluid. The plasticity of the potting mixture at any temperature below 100° C. is such that there is no tendency for the finely divided material to sink therein. The finely-divided material can be in other forms and sizes of polystyrene or can be composed of the other dielectric materials, for example hard finely-divided polyethylene which has a specific gravity of 0.92 and therefore would not under any conditions tend to sink in the potting material.

Over the layer of finely-divided material 19 is poured a polymerizable casting resin composition 20 which adheres to the walls of the can 15 and the component leads 11 and forms a continuous seal across the open mouth of the can. The material of this layer is preferably fluid when applied to facilitate manufacture. It should not shrink excessively when cured since otherwise it would pull away from the can walls. Its curing temperature should be preferably low, and in its pourable state it should be sufficiently viscous to bridge the spaces between adjacent particles in the underlying layer 19 and not enter that layer to any substantial extent either under the effects of gravity or capillary action.

Liquid ethoxyline casting resins (plasticized epichlorhydrin-bisphenol reaction products) have been employed successfully as a sealing layer 20 for the can. The viscosity of the catalyzed material in its initial liquid form can be increased, if necessary, by the addition of powdered silica gel in such quantities (e. g., about 7 per cent) as are needed to obtain the desired pourability and at the same time avoid any substantial penetration of the finely-divided layer 19. The casting material is hardenable at room temperature or at slightly elevated temperatures after the addition of the recommended proprietary hardening agent. A typical hardening mixture for this type of operation comprises 100 parts by weight of plasticized epichlorhydrin-bisphenol resin base and 7 parts by weight of diethylene triamine. Satisfactory commercial casting resins include "Hysol 6020" supplied by Houghton Laboratories of Olean, New York, or "Araldite 101" supplied by Ciba Company Incorporated, Plastics Division, New York, New York, each of which are preferably mixed with the hardening agent recommended by the supplier. The hardening process is improved by carrying it out in an atmosphere which is dry and free from carbon dioxide at a temperature of the order of 60° C. to 100° C. The curing temperature must be kept below the fusion temperature of the material of the finely divided layer to insure the maintenance of the form of that layer.

The completed unit appears as disclosed in the drawing. It is completely sealed by the walls of the can 15 and the cast layer 20. Its assembly is effected principally by a series of pouring operations. No fitted terminal plate is required nor is a punched and fitted closure of sheet insulation necessary. The terminals are fixed in position and sealed by the tough rigid cast sealing layer and the over-all construction forms an economical and effective unit.

What is claimed is:

1. An electrical device comprising a container having an opening therein, an electrical unit positioned therein with terminals extending through said opening, a body of dielectric softenable with heat covering said unit, a layer of finely-divided material having a specific gravity of the order of that of said dielectric positioned over said body, and a seal over said layer for the opening in said container.

2. An electrical device comprising a container open at one end, an electrical unit positioned therein with terminals extending through the open end of said container, a body of potting wax surrounding and covering said unit, a layer of finely-divided material having a specific gravity of the order of that of said potting wax positioned over said body, and a layer of hard sealing material over said finely-divided layer and closing the open end of said container.

3. An electrical device comprising a container open at one end, an electrical unit positioned therein with terminals extending through the open end of said container, a body of polyethylene-polyisobutylene surrounding and covering said unit, a layer of finely-divided material having a specific gravity of the order of 1.05 on said body, and a layer of hard sealing compound on said layer closing the open end of said container.

4. An electrical device as defined in claim 3 wherein the finely divided material is polystyrene.

5. An electrical device as defined in claim 3 wherein the finely-divided material is in the form of beads.

WALTER J. CLARKE.

References Cited in the file of this patent

UNITED STATES PATENTS

| Number | Name | Date |
|---|---|---|
| 2,136,609 | Butterfield et al. | Nov. 15, 1938 |
| 2,194,703 | Kater | Mar. 26, 1940 |